(12) United States Patent  
Wasson et al.

(10) Patent No.: US 7,486,041 B2
(45) Date of Patent: Feb. 3, 2009

(54) ELECTRIC MOTOR WITH ADJUSTABLE TIMING

(75) Inventors: Dewain L. Wasson, Hudson, WI (US); Karmen D. Cox, St. Peters, MO (US)

(73) Assignee: McMillan Electric Company, Woodville, WI (US)

( * ) Notice: Subject to any disclaimer, the term of this patent is extended or adjusted under 35 U.S.C. 154(b) by 0 days.

(21) Appl. No.: 11/537,221

(22) Filed: Sep. 29, 2006

(65) Prior Publication Data

US 2007/0159124 A1  Jul. 12, 2007

Related U.S. Application Data

(60) Provisional application No. 60/722,597, filed on Sep. 30, 2005.

(51) Int. Cl.
*H02K 17/32* (2006.01)

(52) U.S. Cl. .................. 318/434; 318/433; 318/432

(58) Field of Classification Search ............... 318/254, 318/138, 439, 432, 433, 434, 636, 400.1
See application file for complete search history.

(56) References Cited

U.S. PATENT DOCUMENTS

| | | | |
|---|---|---|---|
| 4,520,302 A | 5/1985 | Hill et al. | |
| 4,651,069 A | 3/1987 | Pellegrini | |
| 4,658,192 A | 4/1987 | Casteel et al. | |
| 4,772,839 A | 9/1988 | MacMinn et al. | |
| 4,777,419 A | 10/1988 | Obradovic | |
| 4,929,871 A | 5/1990 | Gerfast | |
| 5,196,775 A | 3/1993 | Harris et al. | |
| 5,420,492 A | 5/1995 | Sood et al. | |
| 5,534,763 A | 7/1996 | Williams et al. | |
| 5,600,218 A | 2/1997 | Holling et al. | |
| 5,703,456 A | 12/1997 | Cox | |
| 5,821,713 A | 10/1998 | Holling et al. | |
| 5,841,252 A | 11/1998 | Dunfield | |
| 5,844,388 A | 12/1998 | Maiocchi | |
| 5,854,548 A | 12/1998 | Taga et al. | |
| 6,388,416 B1 | 5/2002 | Nakatani et al. | |
| 6,448,724 B1 | 9/2002 | Kleinau et al. | |
| 6,583,593 B2 | 6/2003 | Iijima et al. | |
| 6,735,537 B2 | 5/2004 | Liu et al. | |
| 6,850,019 B2 | 2/2005 | Gerfast | |
| 6,850,021 B1 * | 2/2005 | Golownia et al. | 318/432 |
| 6,862,195 B2 | 3/2005 | Jitaru | |
| 2005/0209814 A1 * | 9/2005 | Song | 702/145 |

OTHER PUBLICATIONS

International Search Report mailed Sep. 18, 2007.
Nakamura et al., *High-Efficiency Drive due to Power Factor Control of a Permanent Magnet Synchronous Motor*, APEC, Feb. 23-27, 1992 Seventh Annual Applied Power Electronics Conference and Exposition, Toshiba Corporation, Mie, Japan, front cover, pp. 263-268, and back cover.

* cited by examiner

*Primary Examiner*—Karen Masih
(74) *Attorney, Agent, or Firm*—Merchant & Gould P.C.

(57) ABSTRACT

An electrically commutated motor includes a first module to measure a current in a coil of the motor, and a second module to adjust timing of commutation of the motor based on the current measurement.

28 Claims, 10 Drawing Sheets

ELECTRIC MOTOR WITH ADJUSTABLE TIMING

RELATED APPLICATION

This application claims the benefit of U.S. Patent Provisional Application Ser. No. 60/722,597 filed on Sep. 30, 2005, the entirety of which is hereby incorporated by reference.

TECHNICAL FIELD

Embodiments disclosed herein relate generally to electric motors.

BACKGROUND

Manufacturers of consumer and industrial equipment have historically used either shaded pole or permanent split-capacitor ("PSC") motors to convert alternating current ("AC") electrical energy into rotational mechanical energy, especially in low horsepower applications (e.g., at 1 horsepower or less). These AC motor technologies are reliable and can be manufactured at a low cost. The power source for these motors has historically been of the single phase type. PSC motors, which are usually more efficient than shaded pole motors, exhibit efficiencies in the 60 percent range at their peak performance. PSC and Shaded pole motor efficiencies are reduced when lower speed performance is required of the same motor. Energy costs and conservation efforts have caused an increase in demand for more efficient motors.

SUMMARY

Embodiments of the present invention relate generally to electric motors.

According to one aspect, electrically commutated motor includes a first module to measure a current in a coil of the motor, and a second module to adjust timing of commutation of the motor based on the current measurement.

DETAILED DESCRIPTION

Embodiments disclosed herein relate generally to electric motors, such as single or multi-phase electric motors. While the disclosure is not so limited, an appreciation of the various aspects of the disclosure will be gained through a discussion of the examples provided below.

Figure 1:
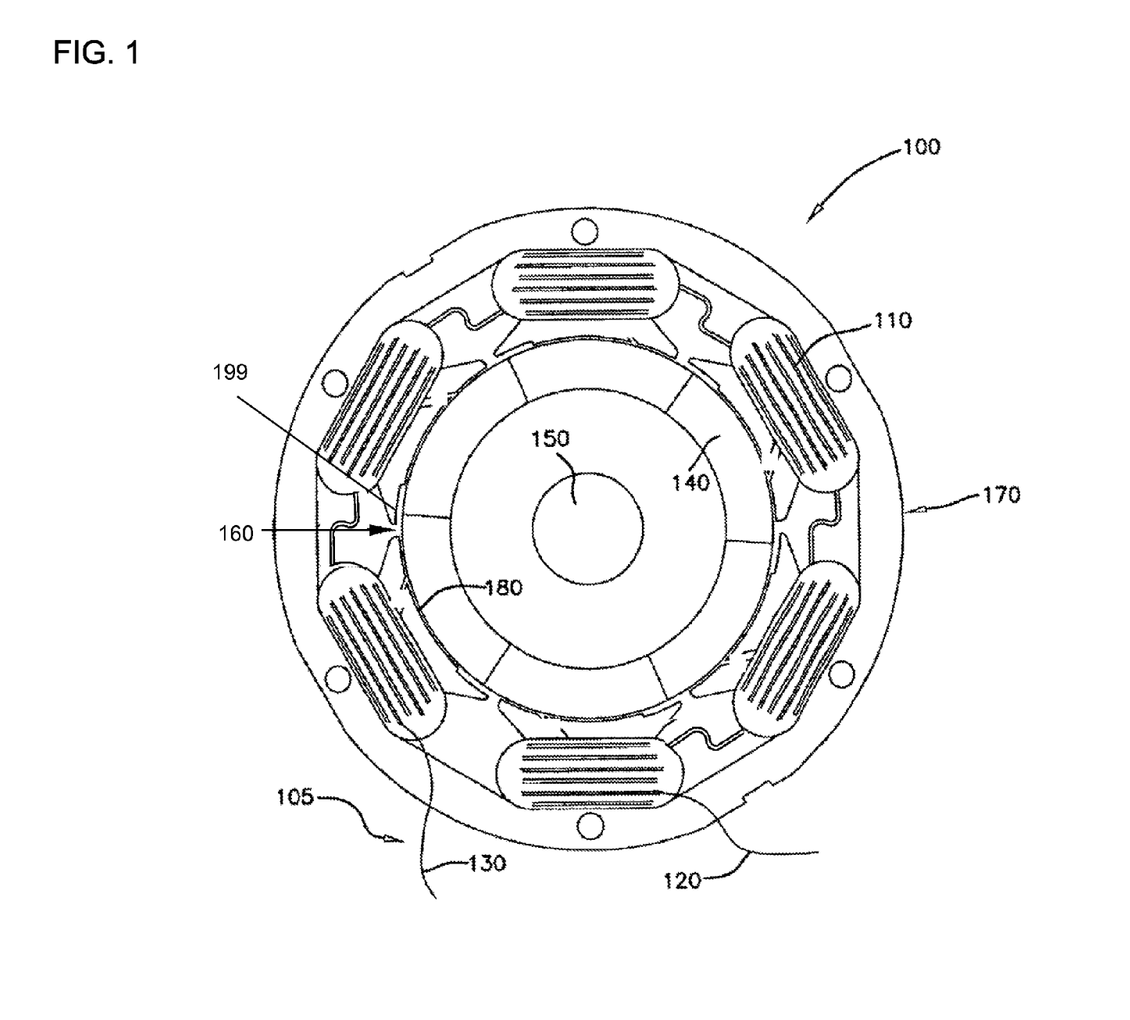
FIG. 1 is a partial cutaway view of an example single phase, direct current permanent magnet brushless electric motor.

Referring now to FIG. 1, an example embodiment of a single phase, direct current permanent magnet brushless motor 100 is shown. Generally, motor 100 includes a stationary stator 170 and a rotatable rotor 160. An air gap 180 formed between the stator 170 and the rotor 160 in the example shown is concentrically uniform, irrespective of reluctance notches 199 formed in the stator.

The stator 170 includes a plurality of stator poles 110 individually wound and connected to form a single coil 105 with two free ends 120 and 130. The single coil 105 can be formed using a variety of techniques such as, for example, a bifilar winding. Each stator pole 110 is formed by winding a coil in a given direction. Each alternating pole 110 is wound in an opposite direction and connected to the next pole to form an alternating series of north and south stator poles.

In addition, the rotor 160 of the motor 100 includes a plurality of rotor poles 140, formed by permanent magnets coupled to the rotor 160. Each alternating rotor pole 140 is of a different polarity to form an alternating series of north and south rotor poles. The illustrated rotor 160 is an internal rotor, although external or flat-type rotors can also be used.

To operate the motor 100, free ends 120 and 130 of the single coil 105 are connected to a source of electrical power. Specifically, the free end 120 is connected to an electrical source of positive potential, and free end 130 is connected to an electrical source of negative potential. In this configuration, electrical current flows through the single coil 105 in a forward direction, for example, from free end 120 to free end 130. As the current flows through the single coil 105, the stator poles 110 act as electromagnets of alternating north or south polarity, depending on which direction each stator pole 110 is wound.

The rotor poles 140 are attracted to each respective adjacent oppositely-charged stator pole 110, causing the rotor 160 to turn. As the current flowing through the single coil 105 is alternately switched between the forward and a reverse direction, each stator pole 110 changes polarity to attract an oppositely-charged rotor pole 140, causing the rotor 160 to continue spinning. One communication cycle (i.e. the change in the direction of the current through the single coil 105) is required for each pole to cause the rotor to complete a full revolution of 360 degrees. For the illustrated six-pole motor, six commutation cycles are required to cause the rotor 160 to complete one full 360-degree revolution. As the rotor 160 spins, torque is transferred to a shaft 150 that is coupled to the rotor 160 of the motor 100.

Multiple speeds for the motor 100 can be accomplished, for example, with pulse circuits including pulse width modulation ("PWM"), phase control, or multiple windings, or by switching in a current limiting capacitor in an alternating current line, if the motor is driven by rectified alternating current as described in U.S. Pat. No. 4,929,871 to Gerfast.

Reluctance notches 199 formed in each stator pole function to pre-locate rotor 160 relative to stator 170 when motor 100 is at rest. In example embodiments, a sensor (see, e.g., sensor 220 in FIG. 2) is located at a gap at an opposite edge of at least one stator pole (e.g., a particular number of degrees, such as seven, from the leading edge of the stator pole).

Although example motor 100 is a single phase motor, in alternative embodiments, a multi-phase (e.g., two or three phase motor) can also be used. In other embodiments, any brushless, electrically commutated motor can be used, such as a switched reluctance motor.

Figure 2:
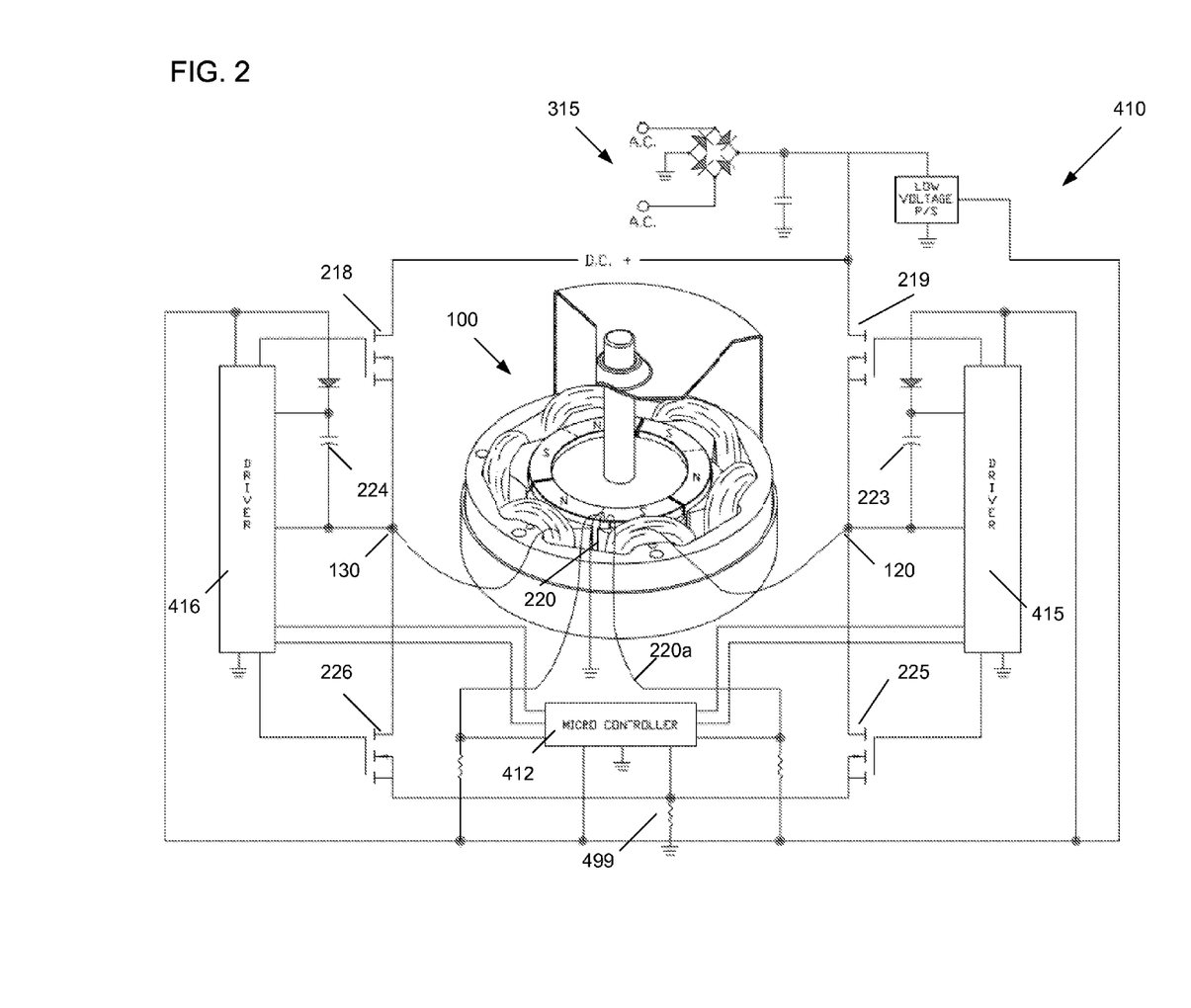
FIG. 2 is a perspective view of the motor of FIG. 1 including an example commutation circuit having a processor.

Referring now to FIG. 2, a sensor 220 is fixed on the stator 170, in close proximity to the permanent magnets on the rotor 160. Sensor 220 is configured to determine the polarity of the magnet positioned in front of it. The sensor 220 is thereby used to provide feedback as to the angular position of the rotor 160 relative to the stator 170 to control the direction of the current (forward or reverse) through the single coil 105, thereby providing the switching necessary to cause the rotor 160 to spin. In alternative embodiments, sensor 220 may be eliminated and the current flowing through resistor 499 can be used for commutation. See FIGS. 8 and 9 below.

Motor 100 is shown including example drive circuit 410. In the example shown, motor 100 is powered using an alternating current ("AC") source 315. Drive circuit 410 can commutate current through the single coil 105 to cause motor 100 to spin, as described above.

Drive circuit 410 includes semiconductor switches 218, 219, 225, and 226 forming an H-bridge circuit. In an example embodiment, N-channel mosfets are used. However, other semiconductor switches such as other mosfets (e.g., P-channel or PNP), insulated gate bipolar transistors (IGBTs), gate turn-off thyristors (GTOs), or other transistors, for example, can also be used.

The switches 218 and 219 function as high-side switches, and the switches 225 and 226 function as low-side switches. The drains of the two high-side switches 218 and 219 are connected to the bus voltage, while the sources of the two low-side switches 225 and 226 are connected to ground through resistor 499. The source of the high-side switch 218 and the drain of the low-side switch 226 are connected to the second end 130 of the single coil 105, while the source of the high-side switch 219 and the drain of the low-side switch 225 are connected to the first end 120 of the single coil 105.

Drive circuit 410 drives the motor 100 as follows. Generally, the drive circuit 410 switches the direction of the current flowing through the single coil 105. When high-side switch 218 and opposite low-side switch 225 are turned on, current flows in a first or "forward" direction through the coil 105. When switches 218 and 225 are turned off, and high-side switch 219 and low-side switch 226 are turned on, current flows in a second or "reverse" direction through the coil 105. As noted above, alternating the direction of the flow of current through the coil 105 causes the rotor 160 to spin, and torque is thereby transferred to the shaft 150.

Example circuit 410 includes a processor 412. In example embodiments, processor 412 is a microprocessor or a microcontroller, or a similar processing device. Processor 412 can be programmed to execute computer-executable instructions, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Figure 2A:
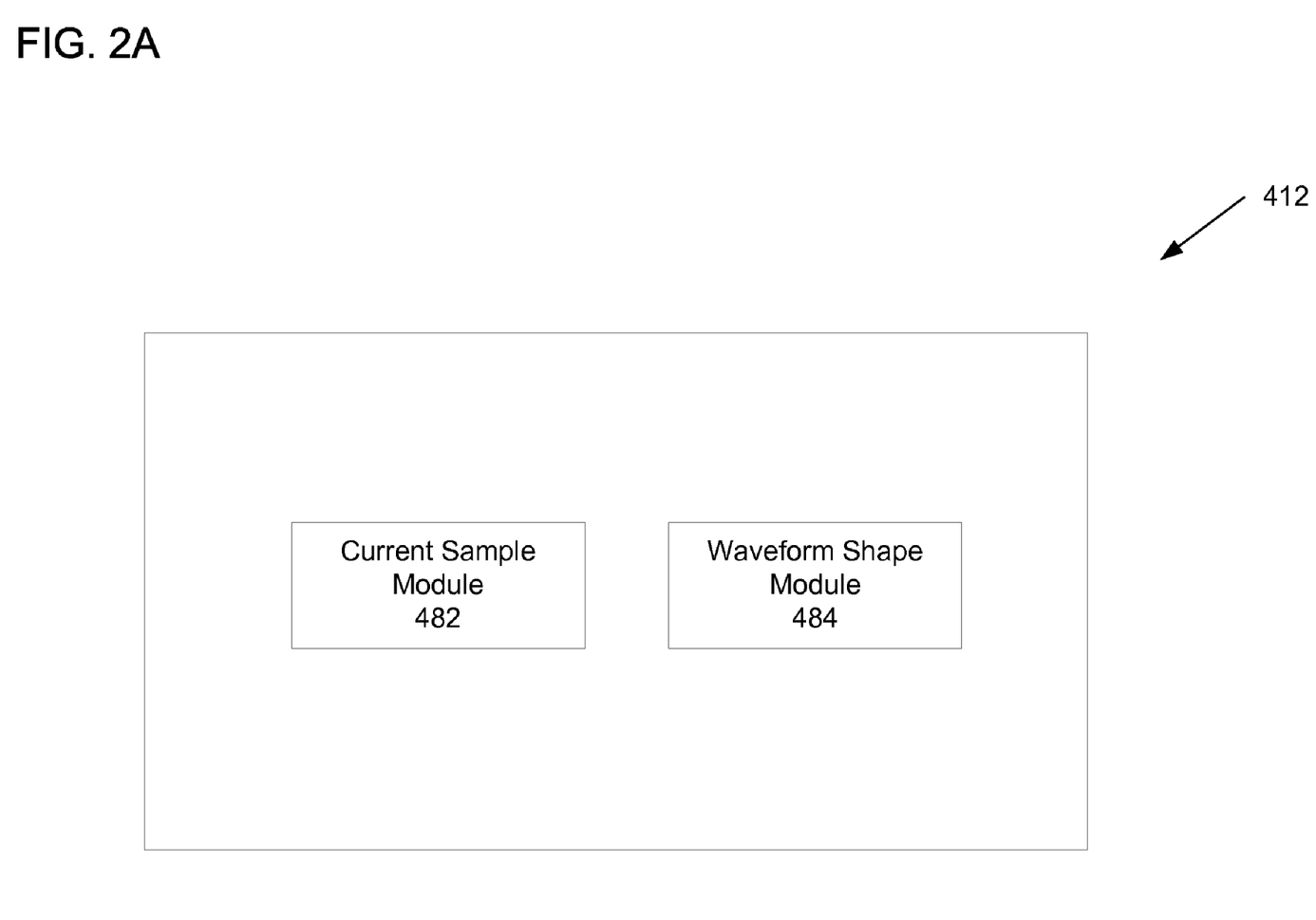
FIG. 2A is a block diagram of certain modules of the processor of the motor of FIG. 1.

Referring now to FIG. 2A, processor 412 is shown in more detail. In example embodiments, processor 412 includes a current sample module 482 programmed to sample the voltage across resistor 499 to measure the current through coil 105. Processor 412 also includes a waveform shape module 484 programmed to calculate at least a portion of a stator current waveform shape, as described further below. Processor 412 can also include other logical modules not depicted in FIG. 2A, such as a commutation module to control the H-bridge circuit. Other configurations are possible.

Embodiments described herein can be implemented as logical operations in a computing system. The logical operations can be implemented (1) as a sequence of computer implemented steps or program modules running on a computer system and/or (2) as interconnected logic or hardware modules running within the computing system. This implementation is a matter of choice dependent on the performance requirements of the specific computing system. Accordingly, the logical operations making up the embodiments described herein are referred to as operations, steps, or modules. It will be recognized by one of ordinary skill in the art that these operations, steps, and modules may be implemented in software, in firmware, in special purpose digital logic, and any combination thereof without deviating from the spirit and scope of the disclosure. This software, firmware, or similar sequence of computer instructions may be encoded and stored upon computer readable storage medium and may also be encoded within a carrier-wave signal for transmission between computing devices.

For example, in alternative embodiments, processor 412 can be replaced with interconnected logic or hardware modules that perform one or more of the same function(s) as processor 412.

In example embodiments, processor 412 can include memory (volatile and/or nonvolatile) to store computer-executable instructions and data from, for example, sensor 220.

Processor 412 is connected to sensor 220 and drivers 415 and 416. Processor 412 generally receives output from sensor 220 and controls drivers 415, 416 to commutate the H-bridge circuit, as described below.

To initiate the change in the state of the switches, sensor 220 is used to measure the angular position of the rotor poles 140 with respect to the stator poles 110. In one embodiment, a single sensor is used, such as a single output Hall sensor that is mounted to the stator 170 adjacent the rotor 160. As the rotor 160 spins, sensor 220 measures the change in polarity as oppositely-magnetized rotor poles 140 pass by the sensor. As the rotor pole 140 (and its associated polarity) positioned in front of the sensor 220 changes, sensor 220 measures the change and provides the commutating signal in order to change the direction of the current flowing through the coil 105. For example, when the polarity of the magnet positioned in front of the sensor 220 causes the sensor 220 to provide a signal (e.g., of positive polarity) on output 220a to processor 412.

In alternative embodiments, sensors other than a single output Hall sensor can be used. For example, a dual output Hall sensor can be used, as well as optical or capacitance sensors. In addition, multiple sensors can be provided. The sensors can also perform functions other than measuring the angular position of the rotor such as, for example, measuring when the rotor has stopped spinning to provide locked rotor protection.

Based on the output from hall sensor 220, processor 412 controls drivers 415, 416 and switches 218, 219, 225, 226 to commutate motor 100. In one state, direct current flows through switch 218, coil 105, switch 225, and resistor 499 to ground, thereby producing a torque in the coil 105 that swings in an opposite polarity to that of the magnet in front of the sensor 220. The torque is transferred to the rotor 160, causing the rotor 160 to spin, and thereby causing the sensor 220 to transition to a second state as another magnet of opposite polarity swings into position in front of the sensor 220. Processor 412 identifies the change in state of sensor 220 and turns switches 218 and 225 off and 219 and 226 on, causing the direct current to flow in the opposite direction through the coil 105.

Additional details regarding example embodiments of motor 100 can be found in U.S. Pat. No. 6,850,019, filed on Jun. 12, 2003 and entitled "Single Coil, Direct Current Permanent Magnet Brushless Motor with Voltage Boost," the entirety of which is hereby incorporated by reference.

As described above, motor 100 includes sensor 220 located mechanically near the leading edge of one stator pole 110. Sensor 220 is used to determine the magnetic polarity of the magnet positioned in front of the stator pole 110. More specifically, sensor 220 is used to provide feedback as to the angular position of the rotor 160 relative to the leading edge of the stator 170.

Since in example embodiments motor 100 is a single phase motor with only a one coil 105, voltage polarity is applied consistent with the position of the rotor 160. This action causes a torque and subsequent rotation between the permanent magnet rotor 160 and the stator 170.

As the permanent magnet rotor 160 moves, rotor 160 generates a back electromotive force ("EMF") voltage in the winding 105. The motor's back EMF is related to the velocity and position of the permanent magnets relative to the stator while in motion. In general, without a load, motor 100 continues to develop torque and accelerate until the amplitude of the back EMF is equal to the applied voltage. The back EMF voltage is proportional to the speed of the motor.

Figure 3:
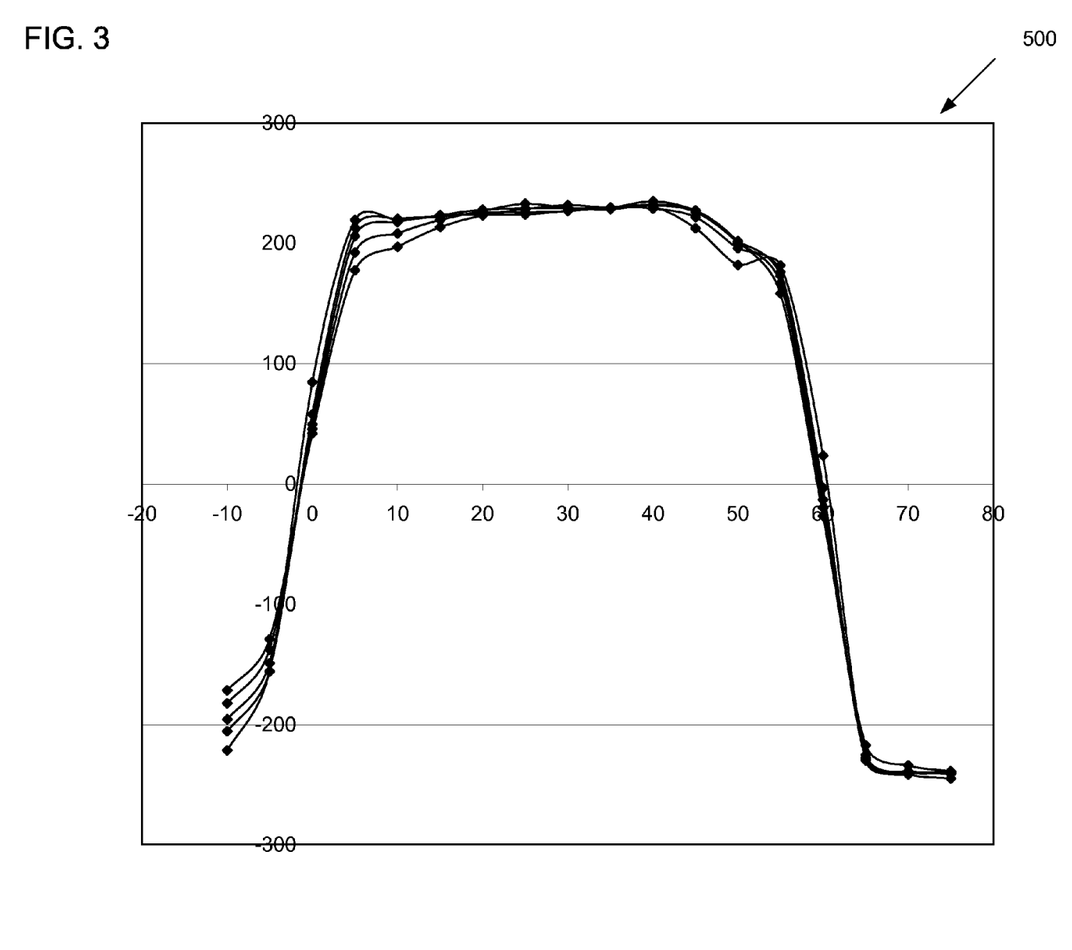
FIG. 3 is a chart showing example electromotive force waveforms for various stator currents of an example single phase, direct current permanent magnet brushless electric motor.

Referring now to FIG. 3, a chart 500 illustrates example back EMF waveforms of a single phase motor. The x-axis of chart 500 represents angle or displacement of the rotor at an arbitrary fixed speed. The multiple traces shown in chart 500 represent various the effect of various stator currents on the back EMF.

In single phase winding 105, the polarity of the applied voltage is reversed in order to commutate motor 100. When the stator voltage is applied or reversed across the stator 170, electrical current flows once the applied voltage is higher than the back EMF voltage and after the inductance is discharged. The inductance of motor winding 105 resists current change, and therefore the reversal in current flow takes a period of time. This delay in time between the applied voltage to the stator 170 and the resultant stator current varies based upon the speed and current of motor 100.

In example embodiments disclosed herein, the voltage across the stator 170 is applied at a given time (e.g., in advance of the change in the motor back EMF), such that a voltage difference is created across the coil 105 that promotes timely current change in the coil 105. By adjusting timing of the application of this voltage on stator 170, motor 100 can be configured to approach zero current in coil 105 at the time that the back EMF in motor 100 is zero.

Timing is defined herein as the application of the motor's applied voltage relative to a known or estimated position of the rotor using, for example, the output of the sensor. As referred to herein, advanced timing describes the state when the voltage is reversed or commutated before the leading edge of the rotor poll crosses the surface of the hall sensor. As referred to herein, delayed timing describes the state when the voltage is reversed after the rotor poll crosses the surface of the sensor.

In example embodiments described herein, sensor 220 is mounted to the stator 170. The fixed location of sensor 220 initially provides direct and slightly advanced motor timing during a startup sequence of motor 100. Once rotor 160 of motor 100 begins to rotate, processor 412 can advance or retard motor timing with respect to the signals from sensor 220, which indicates rotor 160 location.

The power factor is the actual power consumed by the motor ("P"), which is the measured root mean square ("RMS") power, divided by the apparent power ("S"), which is the product of the RMS voltage and current, as expressed below in Equation A.

$$\text{Power Factor} = \frac{P}{S} \quad (A)$$

If the timing for commutation for motor 100 is too late or too early, the current increases with respect to motor power and the power factor can decrease. Maximizing power factor minimizes the RMS stator current and resultant copper conduction losses.

Maximizing power factor can also minimize negative torque pulses that can occur in a single phase motor during each commutation cycle if the timing is improper. In some embodiments, negative torque pulses are not desirable. Negative torque can increase the stator current and reduces the efficiency of the motor. Negative torque can also cause audible noise.

Figure 4:
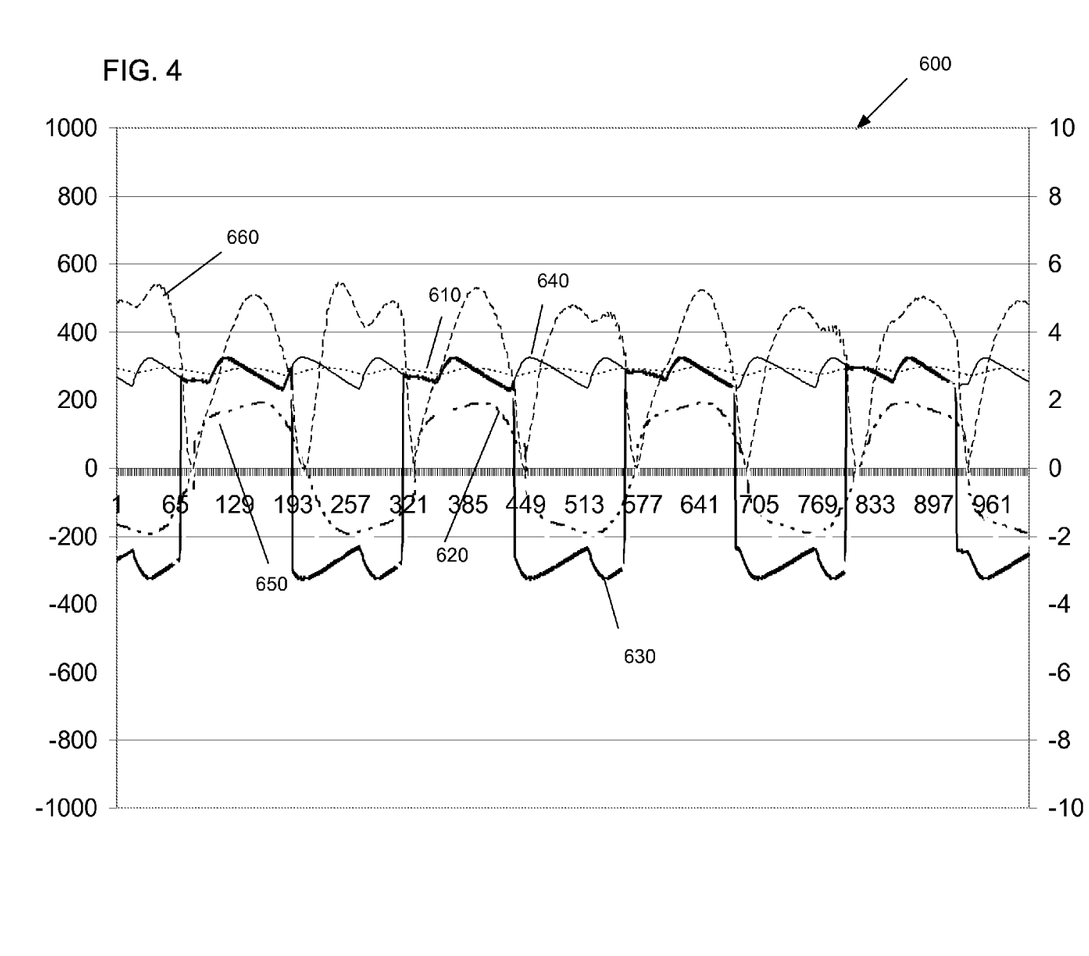
FIG. 4 is a chart showing example waveforms for various aspects of an example single phase, direct current permanent magnet brushless electric motor.

Referring now to FIG. 4, a chart 600 with example waveforms showing maximized power factor and lowest stator current without negative torque is shown.

The following waveforms are shown in chart 600:
610=average voltage;
620=back EMF at a given time;
630=stator voltage;
640=direct current power supply voltage;
650=stator current; and
660=motor torque;

Using microprocessor 410, timing of the applied voltage to the stator 170 can be varied (e.g., advanced timing and delayed timing) to control the current in the stator 170 to achieve a desired waveform shape. For example, timing of the applied voltage can be varied based on the shape of the current waveform. In example embodiments, an optimum power factor occurs when the stator current waveform is of a specified shape (e.g., slope), such as being relatively flat. As used herein, the current waveform shape is a dynamic representation of the current flowing through the coil.

The actual optimum timing between the rotor and stator or between the back EMF voltage and stator current is different depending on the speed and load on the motor. For a given application or range of applications, one motor can operate across a wide range of operating speeds and loads at the highest possible efficiency and lowest possible noise level.

Figure 5:
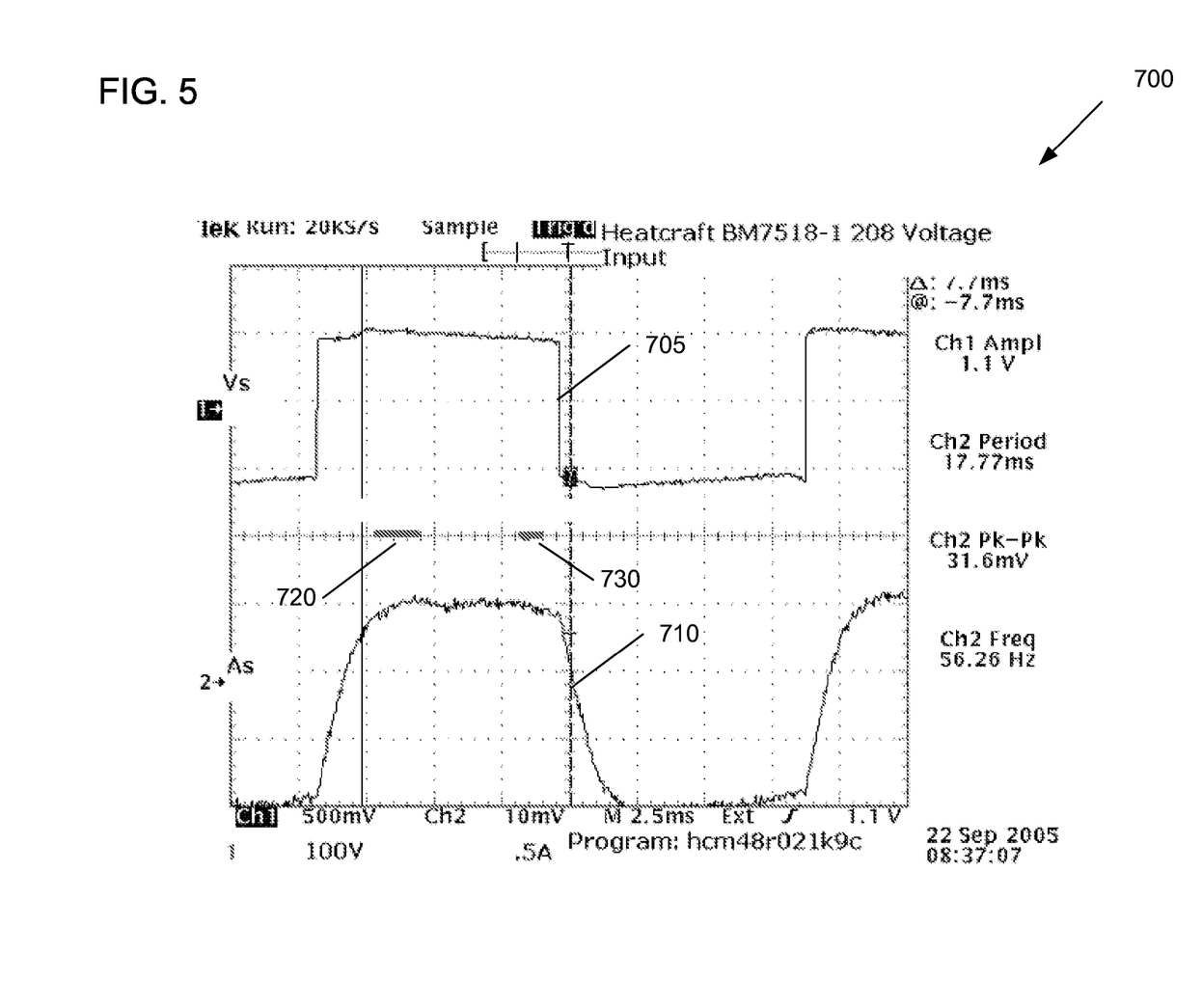
FIG. 5 is a chart showing example voltage and current waveforms of an example single phase, direct current permanent magnet brushless electric motor.

Referring now to FIG. 5, an example chart 700 illustrates an example voltage waveform 705 and a corresponding current waveform 710 measured through coil 105. In example embodiments, timing of the commutation of motor 100 can be advanced or delayed based on the shape (e.g., slope) of waveform 710. For example, in some embodiments, the slope of the positive/negative portions of waveform 710 is sampled, and commutation of motor 100 is modified to maintain the slope at a desired value.

For example, processor 412 can sample the current at two or more points in time during a commutation cycle. Based on the sample current(s), processor 412 can adjust the timing (e.g., advance or delay) to optimize performance of motor 100. In some examples, a plurality (e.g., hundreds) of current readings can be taken, or a running average of current readings maintained to calculate desired timing due to variations in current readings in each commutation cycle. See, e.g., FIG. 4.

In an example embodiment, processor 412 is programmed to sample the current through coil 105 at two times during a commutation cycle, a first time and a second time. In the example, the first time is during the increase of the current ("First Current"), and the second time is during the decrease of the current ("Second Current"). In one non-limiting example, the First Current is measured at interval 720 corresponding to about ¼ of the commutation cycle, and Second Current is measured at interval 730 corresponding to about ⅞ of the commutation cycle. In alternative embodiments, measurements can be taken at other points along the commutation cycle.

In one example, processor 412 is programmed to calculate an average of a plurality of First Current and Second Current measurements prior to adjusting the timing. In another example, processor 412 is programmed to identify a maximum current at the given interval. In other examples, processor 412 can be programmed to sample the current at more than two points during a commutation cycle, or at different points during a commutation cycle.

Processor 412 is also programmed to compare the First Current to the Second Current and to adjust the timing, if necessary. For example, in one embodiment, processor 412 compares the First Current to the Second Current and advances or delays timing based on the comparison to maintain the First Current in a specified relationship with respect to the Second Current. For example, in one embodiment, a fixed relationship is maintained.

In one non-limiting example, the First Current is adjusted using a fixed offset ("Current Offset") so that the First Current is slightly lower than the Second Current. In one example, the Current Offset is calculated for each motor type and can be varied for a given motor. For example, in one embodiment, the Current Offset is varied depending on whether or not the motor is being controlled using PWM. For example, the Current Offset can be varied depending on the percentage of PWM or speed or drive current.

In example embodiments, processor 412 is programmed to compare the First Current to the Second Current (taking into account the Current Offset), and to adjust the timing based on the comparison. Various methods can be used to compare the First Current to the Second Current. These methods can generally include comparison of the First Current to the Second Current to determine if a specified relationship between the First Current and Second Current is maintained.

For example, in one embodiment, a comparison is made to determine if the First Current equals the second Current (taking into account the Current Offset). If the First Current does not equal the Second Current, the timing is adjusted. In other embodiments, a comparison is made to determine if the First Current is within a certain range or tolerance of the Second Current, and the timing is adjusted if the First Current falls outside the range or tolerance. In yet other embodiments, a comparison of the ratio of the First Current to the Second Current is made, and the timing is adjusted if the ratio falls outside a range or tolerance. Other methods for comparing the First Current to the Second Current can be used.

For example, in an alternative embodiment, the relationship is set so that the First Current is equal to the Second Current for a PWM of 75% and below and has an advance where the First Current is greater than the Second Current by a value for 100% PWM. For between 75% and 100%, the advance can be linearly scaled from 0 to the advance value. In other embodiments, the PWM, current or speed can be used to calculate the desired advance or delay. The limits in advance or delay can be changed depending on speed, current or RPM.

As a motor is coordinated for a given load, differences in motor design may require that a condition other than a flat waveform shape at full power be maintained as compared to operating at some lower power setting.

In example embodiments, First Current is compared to Second Current for each commutation cycle. In other embodiments, the currents are compared at periodic intervals, such as at each "n" commutation cycle, where "n" is 2, 5, 10, or some other interval.

Figure 6:
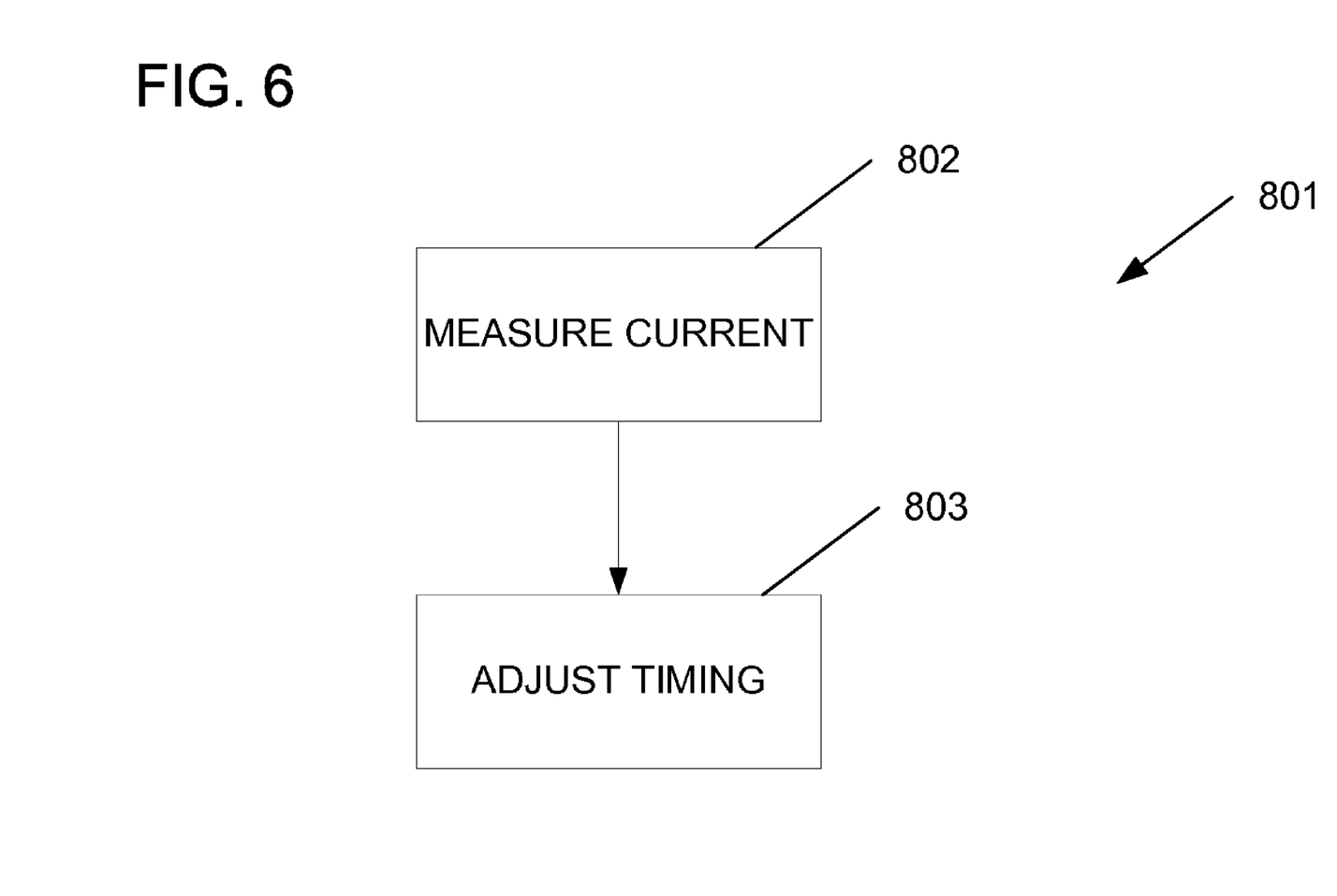
FIG. 6 is an example method for adjusting the timing of an example electric motor.

Referring now to FIG. 6, an example method 801 for adjusting the timing of a motor is shown. At operation 802, a current measurement in the coil of a motor is taken. Next, at operation 803, the timing for commutation of the motor is adjusted based on the current measurement.

Figure 7:
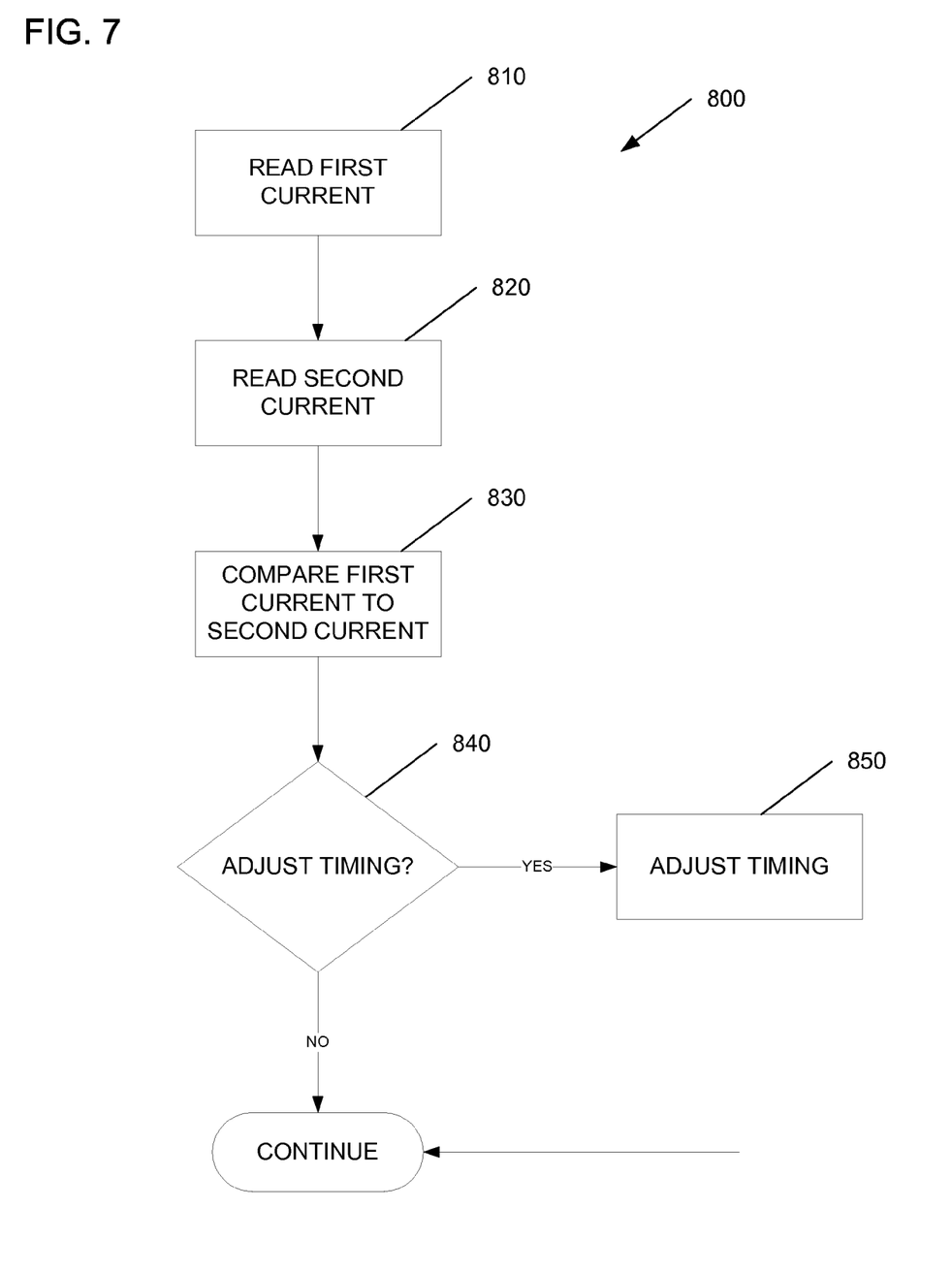
FIG. 7 is another example method for adjusting the timing of an example electric motor.

Referring now to FIG. 7, another example method 800 for adjusting the timing of motor 100 is shown. Beginning at operation 810, a first current reading (e.g., First Current) for a commutation cycle is taken. Next, at operation 820, a second current reading (e.g., Second Current) is taken. Control is then passed to operation 830, and the first current reading is compared to the second current reading using, for example, one or more of the comparison methods described above.

Next, at operation 840, a determination is made regarding whether the timing of commutation should be adjusted based on the comparison of the first and second current readings. If, based on the comparison of the first and second current readings, the timing is to be adjusted, control is passed to operation 850, and the timing for one or more subsequent commutation cycles is adjusted (e.g., advanced or delayed) accordingly.

As noted above, method 800 can be conducted for each commutation cycle, or at each "n" cycles.

In alternative embodiments, the timing is advanced to the point of creation of a slight negative torque. The benefit of this operating condition is higher voltage across the coil ($V_{back\ EMF}+V_{applied}$) for various reasons, such as in order to switch the current faster and get more power out of the motor and/or to change harmonics.

In other alternative embodiments, sensor 220 can be removed. For example, in alternative embodiments, timing for commutation can be determined based on a combination of one or more of the known positions of the rotor and the current measured through the coil, without regard to any sensor signal.

Figure 8:
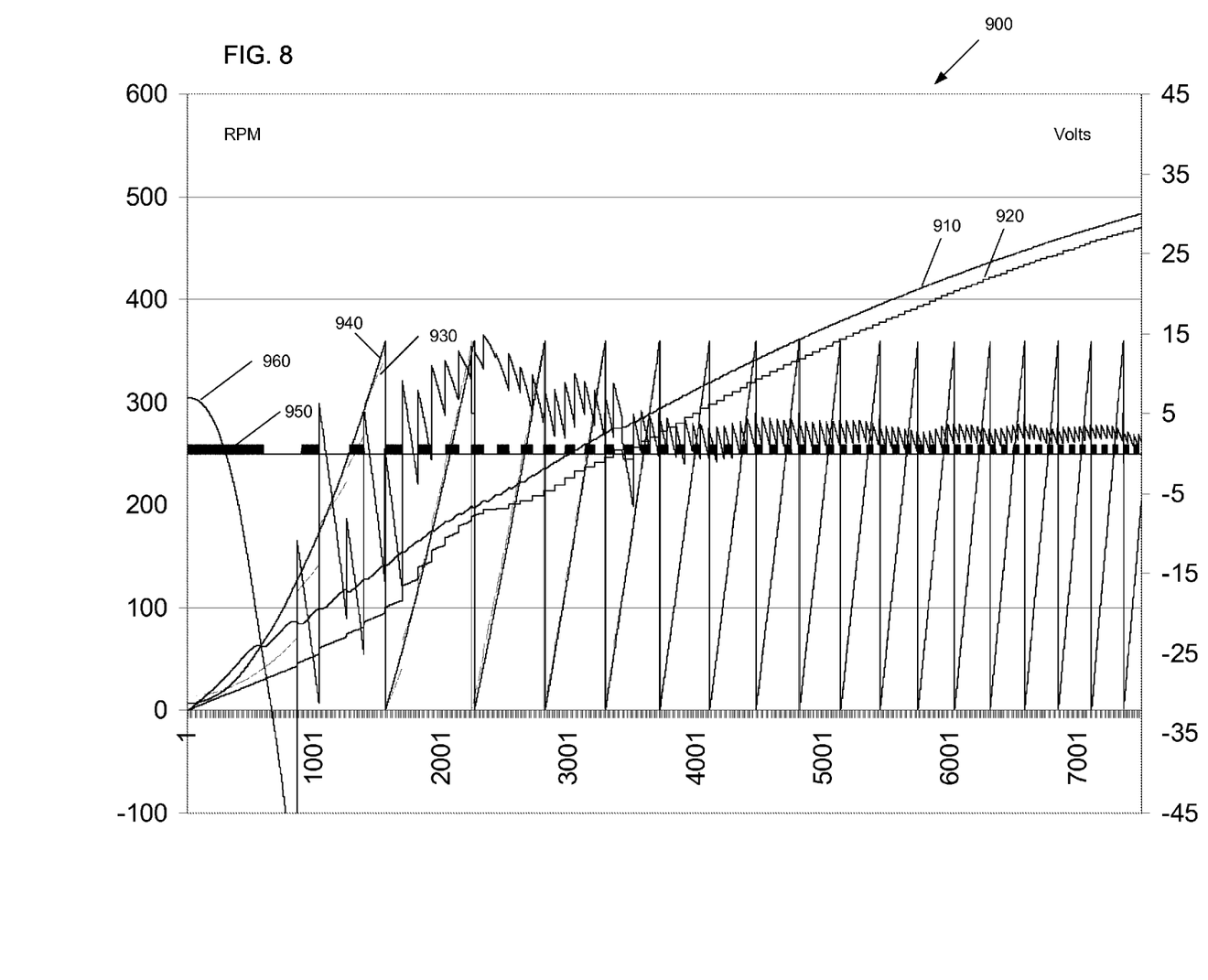
FIG. 8 is a chart showing example waveforms for various aspects of an example single phase, direct current permanent magnet brushless electric motor without a sensor.

For example, referring now to FIG. 8, an example chart 900 is shown showing waveforms for various aspects of a single phase electric motor without a sensor that measures the mechanical location of the rotor (e.g., encoder-less). The following waveforms are shown in chart 900:

910=actual revolutions per minute (RPM) for the motor;
920=RPM for virtual motor;
930=virtual sensor Encoder angle (degrees on the left side);
940=actual motor angle (degrees on the left side);
950=gate drive for one lower switch of H-bridge circuit; and
960=virtual encoder's advance or delay with respect to the motor (degrees on right side).

For the motor illustrated in FIG. 8, timing for commutation is initially estimated based on the known position of the rotor relative to a point of reference, such as a reluctance notch of the motor, or using an activation sequence of the coil or coils, as described further below. As the rotor begins to spin, the current through the coil can be monitored to identify current peaks. The current peaks correspond to the pole changes, and timing for commutation can be estimated based on the current spikes in the coil, as described further below. For example, a virtual motor and virtual sensor encoder (e.g., see waveforms ERPM and DegEncod) can be implemented in software to model actual motor performance and to determine timing for commutation.

Figure 9:
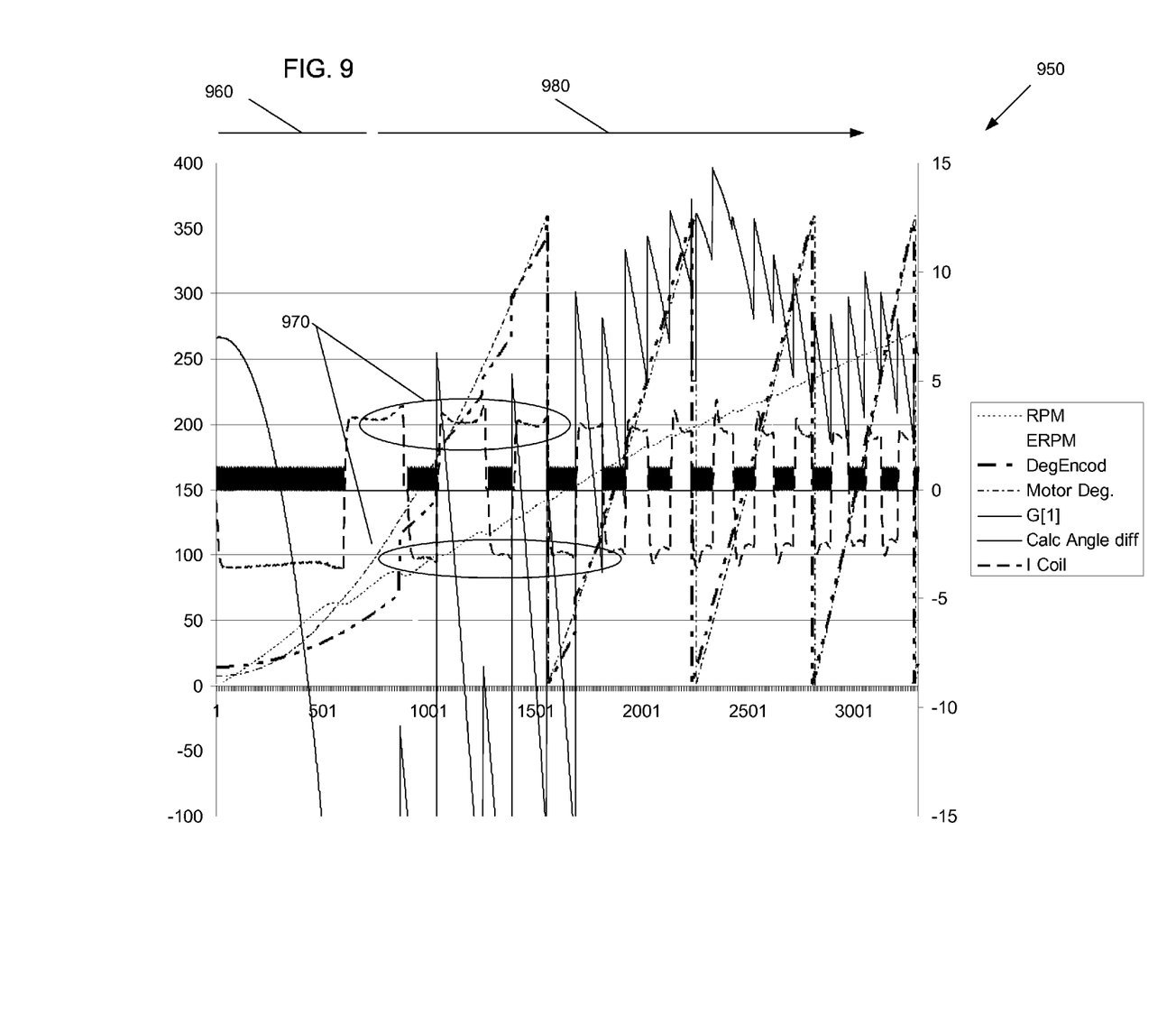
FIG. 9 is another chart showing example waveforms for various aspects of an example single phase, direct current permanent magnet brushless electric motor without a sensor.

Referring now to FIG. 9, another example chart 950 is shown showing waveforms for various aspects of a single phase electric motor without a sensor. At the start of an open loop sequence (interval 960) of maximum time per phase at a fixed PWM, the current is monitored until the current rises over the measured current (see sections 970 as compared to interval 960). When this occurs, it is an indication of motion and negative torque, which can be referred to as current peaks. At this point, the virtual encoder is adjusted to the next commutation angle. Sections 970 can occur several times while interval 980 also occurs. In interval 980, the current peaks stop occurring and, above a given speed, monitoring for the current peaks is stopped and the motor is run from the virtual (simulated) encoder and advance or delay calculations.

In interval 960, power to a given phase output is applied for a given time period, and then the phase direction is changed for a given time period. This is repeated a number of times and, if a current peak used in sections 970 is not detected, the motor either fails to start or a higher PWM percentage or current setting is tried. In the given embodiment the reluctance notch will locate or position the motor to not move or to move in a given direction when power is first applied. If the motor fails to move during the first applied power, reversing the applied power should start it in the right direction. Other phase sequencing time patterns could be used with multi-phased motors.

In sections 970, an increase (e.g., peak) in current of 5% or greater signifies motion beyond pole alignment, and the virtual encoder is aligned to the commutation angle and calculation of a new advance is updated. This is repeated any time the current increase is identified and the motor is turning slowly.

For interval 980 (and during sections 970) current data is collected. At some time during sections 970, the virtual encoder (e.g., 930) is used exclusively to control the timing (e.g., during interval 980).

The above specification, examples and data provide a complete description of the manufacture and use of example embodiments disclosed herein. Since many embodiments can be made without departing from the spirit and scope of the disclosure, the invention resides in the claims hereinafter appended.

What is claimed is:

1. A single coil, single phase, direct current permanent magnet brushless motor, comprising:
    a rotor with a plurality of permanent magnets;
    a single coil;
    a stator with a plurality of salient poles, with each pole being formed by winding the single coil in a direction opposite to an adjacent pole to form a series of alternating poles wound in different directions;
    a sensor to sense a position of the rotor relative to the stator;
    a commutation module to commutate the motor;
    a current sample module programmed to sample a current through the single coil of the motor at least two times during a single commutation cycle; and
    a waveform shape module programmed to compare sampled currents to estimate a current waveform characteristic through the single coil;
    wherein the commutation module is programmed to adjust timing of a commutation of the motor based upon the current waveform characteristic to adjust advance or delay the commutation.

2. The motor of claim 1, wherein the sensor is a single output Hall sensor.

3. The motor of claim 1, wherein the sensor is a dual output hall sensor.

4. The motor of claim 1, further comprising a second sensor to sense the position of the rotor relative to the stator.

5. The motor of claim 1, wherein the sensor is located mechanically near a leading edge of one of the salient poles.

6. The motor of claim 1, wherein the commutation module is programmed to adjust timing of the commutation to advanced or delay timing during a startup sequence.

7. The motor of claim 1, wherein the current sample module is programmed to sample the current at about ¼ of a commutation cycle.

8. The motor of claim 1, wherein the current sample module is programmed to sample the current at about ⅞ of a commutation cycle.

9. The motor of claim 1, wherein the waveform shape module is programmed to calculate an average of the sampled current prior to adjusting timing.

10. The motor of claim 1, wherein the waveform shape module is programmed to determine whether a first current sample is about equal to a second current sample, and wherein the commutation module is programmed to adjust the timing of the commutation of the motor if the first current sample is not about equal to the second current sample.

11. The motor of claim 1, wherein the waveform shape module is programmed to calculate a difference between a first current sample and a second current sample, and to determine whether the difference is outside of a predetermined range, and wherein the commutation module is programmed to adjust the timing of the commutation of the motor if the difference is outside of the predetermined range.

12. The motor of claim 1, wherein the waveform shape module is programmed to calculate a ratio between a first current sample and a second current sample, and to determine whether the ratio is outside of a predetermined range, and wherein the commutation module is programmed to adjust the timing of the commutation of the motor if the ratio is outside of the predetermined range.

13. The motor of claim 1, wherein the commutation module is programmed to adjust timing of the commutation such that a first current sample is about equal to a second current sample when a pulse width modulation is equal to and less than 75%, and such that the first current sample is greater than the second current sample when the pulse width modulation is about equal to 100%, and such that the first current sample is linearly scaled for the pulse width modulation between about 75% and 100%.

14. The motor of claim 1, wherein the current sample module is programmed to sample the current during each N commutation cycles, where N is an integer greater than 1.

15. The motor of claim 1, wherein the current sample module is programmed to take a first sample of the current during a first half of a commutation cycle and a second sample of the current during a second half of the commutation cycle.

16. A method of commutation of a single coil, single phase, direct current permanent magnet brushless motor, the method comprising:
    commutating the motor;
    sampling a current through the single coil of the motor at least two times during a single commutation cycle, wherein the current sample module is programmed to take a first sample of the current during a first half of a commutation cycle and a second sample of the current during a second half of the commutation cycle;

comparing sampled currents to estimate a current waveform characteristic through the single coil; and adjusting timing of the commutation of the motor based upon the current waveform characteristic to advance or delay the commutation.

17. The method of claim 16, wherein measuring the current further comprises:

sampling the current at about ¼ of a commutation cycle; and sampling the current at about ⅞ of the commutation cycle.

18. The method of claim 16, wherein comparing the sampled currents further comprises determining whether a first current sample is about equal to a second current sample, and wherein adjusting the timing further comprises adjusting the timing of the commutation of the motor if the first current sample is not about equal to the second current sample.

19. The method of claim 16, wherein comparing the sampled currents further comprises calculating a difference between a first current sample and a second current sample, and wherein adjusting the timing further comprises adjusting the timing of the commutation of the motor if the difference is outside of a predetermined range.

20. The method of claim 16, wherein comparing the sampled currents further comprises calculating a ratio between a first current sample and a second current sample, and wherein adjusting the timing further comprises adjusting the timing of the commutation of the motor if the ratio is outside of a predetermined range.

21. The method of claim 16, wherein adjusting the timing further comprises adjusting the timing of the commutation such that a first current sample is about equal to a second current sample when a pulse width modulation is equal to and less than 75%, and such that the first current sample is greater than the second current sample when the pulse width modulation is about equal to 100%, and such that the first current sample is linearly scaled for the pulse width modulation between about 75% and 100%.

22. The method of claim 16, further comprising:

powering the motor in a first phase for a first time period, and then a second opposite phase for a second time period;

monitoring the current through the single coil until a current peak is detected;

adjusting a virtual encoder to a next commutation angle;

continuing to monitor for additional current peaks and adjusting the virtual encoder until the current peaks stop occurring;

once the current peaks stop occurring, ceasing to monitor for the current peaks; and commutating the motor using output of the virtual encoder.

23. A single coil, single phase, direct current permanent magnet brushless motor, comprising:

a rotor with a plurality of permanent magnets;

a single coil;

a stator with a plurality of salient poles, with each pole being formed by winding the single coil in a direction opposite to an adjacent pole to form a series of alternating poles wound in different directions;

at least one reluctance notch formed in at least one of the poles of the stator, the reluctance notch being configured to pre-locate the rotor relative to the stator when the motor is at rest;

a commutation module to commutate the motor;

a current sample module programmed to take a first sample of a current through the single coil during a first half of a commutation cycle and a second sample of the current during a second half of the commutation cycle; and a waveform shape module programmed to compare sampled currents to estimate a current waveform characteristic through the single coil, wherein the current waveform characteristic swings through zero current at each commutation cycle to form alternating crests and troughs;

wherein the commutation module is programmed to adjust timing of a commutation of the motor based upon the current waveform characteristic to adjust advance or delay the commutation.

24. The motor of claim 23, further comprising a sensor to sense a position of the rotor relative to the stator.

25. The motor of claim 23, further comprising:

a virtual RPM sensor programmed to estimate an RPM of the motor; and a virtual encoder programmed to estimate a position of a rotor of the motor;

wherein timing for commutation of the motor is based on output from one of the virtual RPM sensor and the virtual encoder.

26. The motor of claim 25, wherein the timing for commutation is based on the output from the virtual RPM sensor at startup of the motor.

27. The motor of claim 25, wherein current through the single coil is measured until a current peak is detected, and the virtual encoder is adjusted to a next commutation angle upon measuring the current peak.

28. The motor of claim 27, wherein the timing for the commutation is based on the output of the virtual encoder once current peaks through the single coil stop.

* * * * *